Feb. 2, 1954

D. C. VAN IPEREN 2,668,227

DEVICE FOR TREATING WORKPIECES OF A CURVED
OR ANGULAR SHAPE BY INDUCTIVE HEATING
IN A MAGNETIC HIGH-FREQUENCY FIELD

Filed April 17, 1952

*INVENTOR*
Dirk Christiaan Van Iperen

BY

*AGENT*

Patented Feb. 2, 1954

2,668,227

UNITED STATES PATENT OFFICE 2,668,227

DEVICE FOR TREATING WORKPIECES OF A CURVED OR ANGULAR SHAPE BY INDUCTIVE HEATING IN A MAGNETIC HIGH-FREQUENCY FIELD

Dirk Christiaan van Iperen, Eindhoven, Netherlands, assignor to Hartford National Bank and Trust Company, Hartford, Conn., as trustee Application April 17, 1952, Serial No. 282,754

Claims priority, application Netherlands May 22, 1951

3 Claims. (Cl. 219—47)

This invention relates to devices for treating work-pieces by inductive heating in a magnetic high-frequency field. Devices are known in which the work-piece at the area to be treated, in planes which are cross-sections thereof, is surrounded by one or more metallic members of which the axial direction is at right angles to the said planes and which are traversed by the current required for producing the high-frequency field. The object of such members is to concentrate the heat produced by the current induced in the workpiece by the magnetic field as much as possible to the area of treatment, thus increasing the efficiency of the device. It is also known to provide the metallic members with slots to force the current to follow a desired path as a function of the kind of the work-piece to be treated.

It has been found that in cases in which the work-piece has a curved or angular shape, the choice of area and position of the slots adapted to the kind of the work-piece is not suitable without further expedients in the members to be used for obtaining suitable distribution of the amount of heat at the areas to be treated.

The object of the invention is to provide by means of which the said disadvantage is obviated in a device of the above-mentioned kind.

According to the invention, a device for treating work-pieces of a curved or angular shape by inductive heating in a magnetic high-frequency field, in which the work-piece at the area to be treated, in planes which are cross-sections thereof, is surrounded by one or more metallic members comprising slots, of which members the direction of the axes is thus at right angles to the said planes and which are traversed by the current required for producing the high-frequency field, is characterized in that the members in practice comprise one or more slots, if desired filled up with material which is electrically non-conductive, and of which the direction adjoining the heating areas makes an angle of from 60° to preferably 90° with the said direction of the axes at the said areas, in such manner that a more even current distribution through the member about the direction of the axis is obtained. The direction of the slots is preferably as much as possible at right angles to the direction of the axes.

The advantage is thus obtained that the direction of the current flowing in the metallic members may as far as possible coincide with the planes which are cross-sections of the work-piece, so that as a result thereof the direction of the field also corresponds as far as possible to the direction of the axis and the currents induced in the work-piece flow as far as possible in the planes of the cross-sections. This results in a more even and economic heating of the work-piece at the desired areas.

In order that the invention may be more clearly understood and readily carried into effect, it will now be described in greater detail with reference to the accompanying drawing by way of example.

Figure 1:
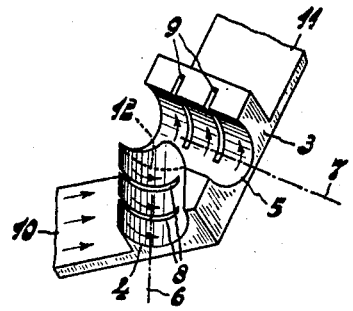
Fig. 1 shows one embodiment of a member formed as one half of a working coil for surrounding the work-piece.
Figure 2:
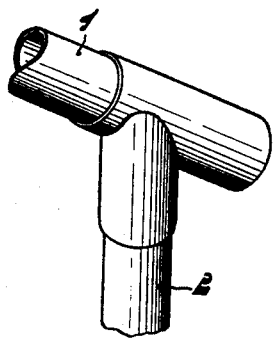
Fig. 2 shows the work-piece, for example two tubes of a bicycle frame which are required to be brazed together at an angle.

The work-piece shown in Fig. 2 is constituted by two tubular parts 1 and 2 which are required to be brazed together by high-frequency heating. For this purpose the work-piece, together with the tube 1, is placed in a member 3 (vide Fig. 1), upon which a similar member (not shown for the sake of simplicity) is to be placed, so that a working coil is thus formed about the work-piece.

The member 3 comprises two half cylinders 4 and 5, of which the axes 6 and 7 are at the same angles as the tubes 1 and 2 of the work-piece. Consequently, the cross-sections of the tubes are located in planes at right angles to the axes 6 and 7. The half cylinders 4 and 5 are provided with slots 8 and 9, of which the direction is as far as possible at right angles to the axes 6 and 7. The current path indicated by arrows shows that a current distribution occurs which is much more even than in the absence of the slots, since the current would then follow the shortest route by way of the inner curvature from one terminal 10 to the other terminal 11, so that only a comparatively narrow portion of the cylinder halves 4 and 5 would be active.

Instead of two or more slots per cylinder half, a single slot for example the longest one, as a function of the magnitude, shape and angle between the axes 6 and 7, may be sufficiently effective. In the latter case it may prove necessary to bring, for example, the longest slot 8 nearer to the angle point 12, if necessary even into this angle point. The dotted line shows diagrammatically what might be the shape of such a slot which encloses a minimum angle of more than 60° with the axis 6.

If desirable, for reasons of strength, the slots may be filled up with material which is electrically non-conductive.

Figure 3:
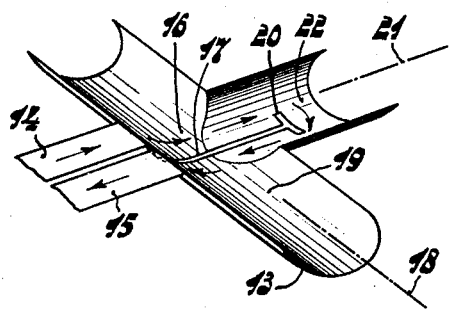
Fig. 3 shows a further embodiment.

In Fig. 3, a metal member 13 comprises, on the same side, current-supply conductors 14 and 15. A part 16 is separated from a part 19 by means of a slot 17 at right angles to the axis 18, so that this slot also serves to separate the current conductors. The slot 17 opens into a slot 20, which in turn is at right angles thereto. The slot 20 is also at right angles to the axis 21 and adjoins a heating area 22, similarly as the slot 17 adjoins the heating areas 16 and 19. Current-supply conductors on one side are particularly suitable for use with the parts forming the coils.

What I claim is:

1. A device for surrounding and treating a workpiece of a curved or angular shape by inductive heating in a magnetic high-frequency field comprising at least two members each having two semi-cylindrical grooved portions for receiving said workpiece and a plurality of slots in said grooved portions, the axes of said grooved portions intersecting each other, and current path means formed by said slots thereby permitting said current to traverse said workpiece, the direction of said current path making an angle of at least 60° with the axes of said grooved portions.

2. A device as claimed in claim 1 wherein one of said members is provided with a plurality of current-supply conductors on one side of said member, a first slot in said member serving to separate said current-supply conductors and a second narrow slot connected to said first slot and being positioned at an angle of at least 60° to said first slot.

3. A device for surrounding and treating a workpiece of a curved or angular shape by inductive heating in a magnetic high-frequency field comprising at least two members each having two semi-cylindrical grooved portions for receiving said workpiece and a plurality of slots in said grooved portions, each of said slots being filled with electrically non-conductive material, the axes of said grooved portions intersecting each other, and current path means formed by said slots thereby permitting said current to traverse said workpiece, the direction of said current path making an angle of at least 60° with the axes of said grooved portions.

DIRK CHRISTIAAN VAN IPEREN.

References Cited in the file of this patent

UNITED STATES PATENTS

| Number | Name | Date |
|---|---|---|
| 2,271,916 | Denneen et al. | Feb. 3, 1942 |
| 2,402,508 | Strickland | June 18, 1946 |
| 2,456,091 | Stevens et al. | Dec. 14, 1948 |

FOREIGN PATENTS

| Number | Country | Date |
|---|---|---|
| 590,341 | Great Britain | July 15, 1947 |
| 655,400 | Great Britain | July 18, 1951 |
| 912,804 | France | Aug. 21, 1946 |
| 948,723 | France | Aug. 9, 1949 |